(12) United States Patent
Cheng

(10) Patent No.: US 6,753,551 B2
(45) Date of Patent: Jun. 22, 2004

(54) LIQUID CRYSTAL DISPLAY WITH WIDE VIEWING ANGLE

(75) Inventor: Hsin-An Cheng, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 214 days.

(21) Appl. No.: 10/013,515

(22) Filed: Dec. 13, 2001

(65) Prior Publication Data

US 2002/0071081 A1 Jun. 13, 2002

(30) Foreign Application Priority Data

Dec. 13, 2000 (TW) .......................... 89126649 A

(51) Int. Cl.$^7$ .................. H01L 27/15; H01L 33/00; G02F 1/133; G02F 1/1337
(52) U.S. Cl. .............. 257/79; 257/98; 349/33; 349/94; 349/99; 349/128; 349/129; 349/167; 349/191
(58) Field of Search ................ 349/168, 170, 349/171, 177, 178, 184, 33; 257/88, 78

(56) References Cited

FOREIGN PATENT DOCUMENTS

| JP | 047218 | 2/2000 |
|----|--------|--------|
| JP | 275646 | 10/2000 |

Primary Examiner—Carl Whitehead, Jr.
Assistant Examiner—David L. Hogans
(74) Attorney, Agent, or Firm—Rabin & Berdo, P.C.

(57) ABSTRACT

A liquid crystal display (LCD) having an oblique electric field while a voltage is applied between the upper plate and the lower plate of the LCD is disclosed. The LCD includes a first regulating device of the upper plate and the second regulating device of the lower plate. As no voltage between the upper and lower plate, the liquid crystal molecules in the proximity of the first and the second regulating device are perpendicular to the upper and the lower plate. After a voltage is applied, an oblique electric field is produced by these regulating devices. The liquid crystal molecules are then rotated to parallel to the upper and lower plates because of the oblique electric field. The first and second regulating devices are bumps made of dielectric material or slits of electrodes.

15 Claims, 18 Drawing Sheets

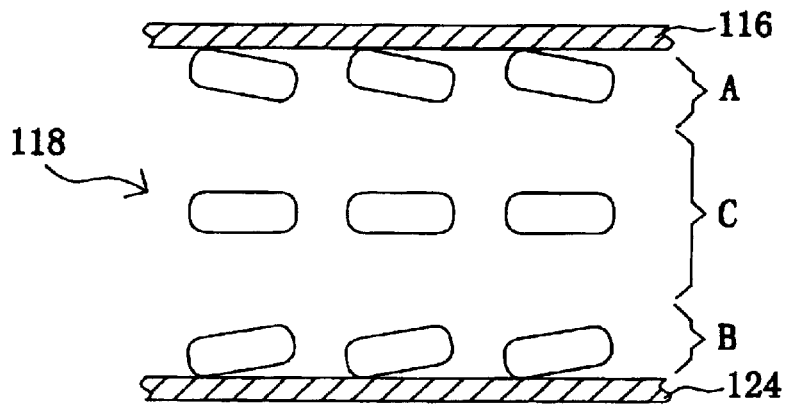
FIG. 3A (Prior Art)
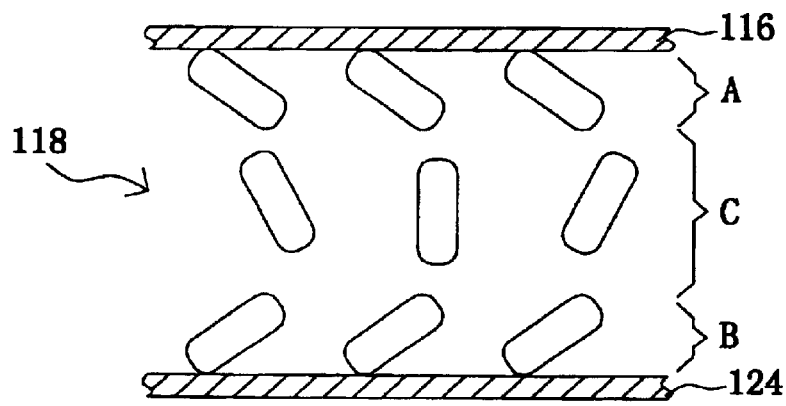
FIG. 3B (Prior Art)
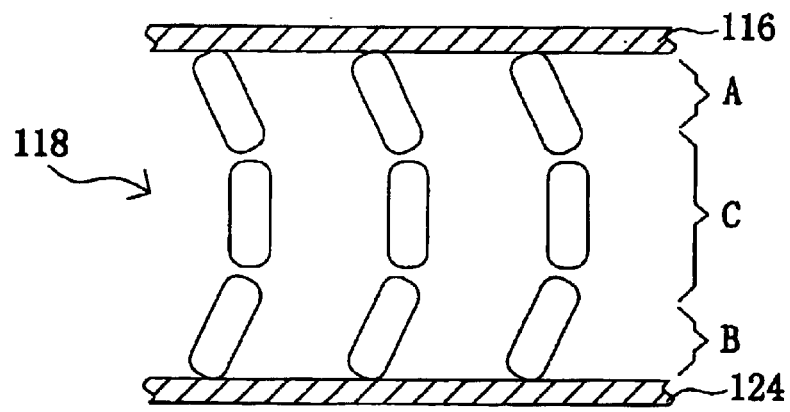
FIB. 3C (Prior Art)

LIQUID CRYSTAL DISPLAY WITH WIDE VIEWING ANGLE

This application incorporates by reference Taiwanese application Serial No. 089126649, filed Dec. 13, 2000.

BACKGROUND OF THE INVENTION

1. Field of the Invention

The present invention generally relates to a liquid crystal display (LCD) with a wide viewing angle, and more particularly to a LCD having a regulating device for aligning liquid crystal molecules with a negative dielectric constant.

2. Description of the Related Art

Benefited from the advantages of the thinness, lightness and low radiation properties, LCDs (Liquid Crystal Displays) have been widely used in the world. However, the contrast ratio will be decreased as the user sees the display from a larger viewing angle, which causes the viewing angle to be within a very limited range. Therefore, how to increase the viewing angle and improve the property of the LCD has been the critical lesson for the researchers.

Referring to FIG. 1, it is a sectional view showing the structure of a conventional LCD. The conventional LCD has an upper plate 102 and a lower plate 104. An upper analyzer film 106 is positioned above the upper plate 102 and a lower polarizer film 108 is positioned under the lower plate 104. The polarization direction of the upper analyzer film 106 is perpendicular to that of the lower polarizer film 108. Moreover, the upper plate 102 includes a glass substrate 110, a color filter 112, a transparent electrode 114, and an alignment film 116. The lower plate 104 includes a glass substrate 120, a transparent electrode 122, and an alignment film 124. The liquid crystal layer 118, including a plurality of liquid crystal molecules 118A, is sandwiched between the upper plate 102 and lower plate 104. After a rubbing process, these liquid crystal molecules are aligned on the alignment films 116 or 124.

When a voltage Va is supplied between the transparent electrode 114 and transparent electrode 122, the alignment of the liquid crystal molecules in the liquid crystal layer 118 will be changed according to the amount of the voltage Va. The direction of light will varied because of different alignment directions of the liquid crystal molecules 118A. Under this condition, the transmittance of the light will be changed according to the state of the liquid crystal molecules 118A in the liquid crystal layer 118. Therefore, the various brightness of the LCD, such as white, dark and gray scale, can be controlled by the various voltage applied between the transparent electrodes 114, 112.

In order to get a wide viewing angle, a LCD using an OCB mode (Optically Compensated Bend mode) has been provided. Referring to FIG. 2, it shows the relation between the applied voltage Va and the transmittance of the LCD with the OCB mode. As the applied voltage Va is 0, the transmittance is T1. If the applied voltage Va equals to the threshold voltage Vc, the transmittance will be the maximum value, T2. When the applied voltage Va is V1, the transmittance is the minimum value 0.

In the OCB mode, the dielectric constant difference of the liquid crystal used in the LCD is positive, and the liquid crystal molecules are in a horizontal alignment on the alignment films 116, 124. The direction of the upper analyzer film 106 is perpendicular to that of the lower polarizer film 108.

Referring to FIG. 3A~3C, the arrangement of the liquid crystal molecules in the liquid crystal layer 1118 are varied by different voltages Va applied to the LCD with the OCB mode. In FIG. 3A, 3B, 3C, the applied voltage Va is 0, Vc, and V1, respectively. The liquid crystal layer 118 comprises a first liquid crystal layer A, a second liquid crystal layer B and a third liquid crystal layer C. The first liquid crystal layer A is contact with the alignment film 116, the second liquid crystal layer B is contact with the alignment film 124, and the third liquid crystal layer C is sandwiched between the first liquid crystal layer A and the second liquid crystal layer B.

In FIG. 3A, the applied voltage Va is zero at the initial state, the angle between the first liquid crystal layer A and the alignment film 116 or the second liquid crystal layer B and the alignment film 124 is very small, about 3 to 8 degree. The liquid crystal molecules in the third liquid crystal layer C turn to parallel to the alignment films 116, 124. This is in a "splay alignment" state. At this time, angles are formed between the liquid crystal molecules and both of the upper and lower analyzers 106, 108, so lights can pass the upper analyzer film 106 through the lower polarizer film 108. The LCD is in a white state.

In FIG. 3B, as the applied voltage Va is Vc, the angle between the first liquid crystal layer A and the alignment film 116 or between the second liquid crystal layer B and the alignment film 124 is increased. The liquid crystal molecules in the third liquid crystal layer C are almost perpendicular to the alignment films 116, 124. This is in a "bend alignment" state. At this time, the LCD is in the white state and has a maximum brightness.

In FIG. 3C, as the applied voltage Va is V1, the angle between the first liquid crystal layer A and the alignment film 116 or between the second liquid crystal layer B and the alignment film 124 is increased to a maximum, about 80 degrees or more. The liquid crystal molecules in the third liquid crystal layer C are substantially perpendicular to the alignment films 116, 124. In other words, the aligned direction of all liquid crystal molecules are almost perpendicular to the upper analyzer 106 and lower polarizer 108, so lights can't pass through these polarizers. At this time, the LCD is in a dark state.

The OCB mode works when the applied voltage Va between the upper and lower plate 102, 104 is in a range between the threshold voltage Vc and V1. The various brightness and the gray scale of the LCD are achieved by various voltage Va. In the OCB mode, the liquid crystal molecules can be arranged well, the liquid crystal molecules rotate in the same direction, and the friction between the liquid crystal molecules is reduced. Therefore, the LCD with OCB mode has the advantages of fast response and the wide viewing angle. However, it is unstable when the applied voltage is in the range between zero and the threshold voltage Vc. In this unstable stage, the LCD with the OCB mode is non-operated. In order to operate the LCD, the applied voltage should be higher than the threshold voltage Vc. It takes a time to increase the applied voltage Va from zero to the threshold voltage Vc. In other words, the response time of the LCD with OCB mode is slow and the applied voltage Va is high.

SUMMARY OF THE INVENTION

From the above description, the object of the present invention is to provide a LCD having a wide viewing angle. The LCD is in the dark state without applied voltage and in a white state with the applied voltage, such that the contrast ratio of the LCD is increased. A plurality of domains are defined by opposite regulating devices on the upper and lower substrates to achieve the advantages of the wide viewing angle, high contrast ratio and high response speed.

According to the present invention, a liquid crystal display having a wide viewing angle includes a first substrate, a first electrode, a first regulating device, a second substrate, a pixel electrode, a second regulating device and a liquid crystal layer. The first substrate includes a first surface thereon. The first electrode and the first regulating device having a first inclined plane are formed on the first surface. The second substrate has a second surface, and the first surface of the first substrate is opposed to the second surface of the second substrate. The pixel electrode and the second regulating device with a second inclined plane are formed on the second substrate. The first regulating device is opposed to the second regulating device. The liquid crystal layer is positioned between the first substrate and the second substrate. The liquid crystal layer includes a plurality of liquid crystal molecules with a negative anisotropic dielectric constant. The liquid crystal layer comprises a first liquid crystal molecule in the proximity of the first regulating device, a second liquid crystal molecule in the proximity of the second regulating device, and a third liquid crystal molecule between the first and second liquid crystal molecules.

While no driving voltage is applied between the first electrode and the pixel electrode, (a) the first liquid crystal molecule is perpendicular to the first inclined surface, a first angle is formed between the first substrate and the first liquid crystal molecule, and the first angle is an acute angle, (b) the second liquid crystal molecule is perpendicular to the second inclined surface, a second angle is formed between the first substrate and the second liquid crystal molecule, and the second angle is an obtuse angle, (c) the third liquid crystal molecule is perpendicular to the first substrate, such that the angle between the first and third liquid crystal molecules and the angle between the third and second liquid crystal molecules are both obtuse angles.

While a driving voltage applied between the first electrode and the pixel electrode, an oblique electric field is formed between the first substrate and the second substrate because of the first regulating device and the second regulating device. The first liquid crystal molecule rotates along a first direction, the second liquid crystal molecule rotates along a second direction, and the first direction is contrary to the second direction. Therefore, all liquid crystal molecules are almost parallel to the first substrate because of the oblique electric field.

In addition, the LCD is in a dark state while no driving voltage is applied between the first electrode and the pixel electrode. The LCD will be in a white state when a driving voltage is applied between the first electrode and the pixel electrode.

Moreover, a plurality of pixel areas are defined between the upper plate and lower plate. Each pixel area is divided to many domains by the first regulating device and the second regulating device.

These advantages of the present invention will become apparent to those skilled in the art upon reading and understanding the following detailed description with reference to the accompanying figures.

BRIEF DESCRIPTION OF THE DRAWINGS

FIGS. 3A~3C show the arrangement of the liquid crystal molecules in the liquid crystal layer when different voltages Va are applied on the LCD with the OCB mode.

DESCRIPTION OF THE PREFERRED EMBODIMENT

The LCD (Liquid Crystal Display) in the present invention has the advantages of the VA (vertical alignment) mode and the OCB (Optically Compensated Bend) mode. These advantages include a wide viewing angle, a high contrast ratio, and a high response speed of the liquid crystal molecules. These advantages can be achieved by a lateral oblique electric field formed in the liquid crystal layer, a vertical alignment of the liquid crystal molecules, and a negative difference of the dielectric constant for the liquid crystal molecules.

First Embodiment

Figure 1:
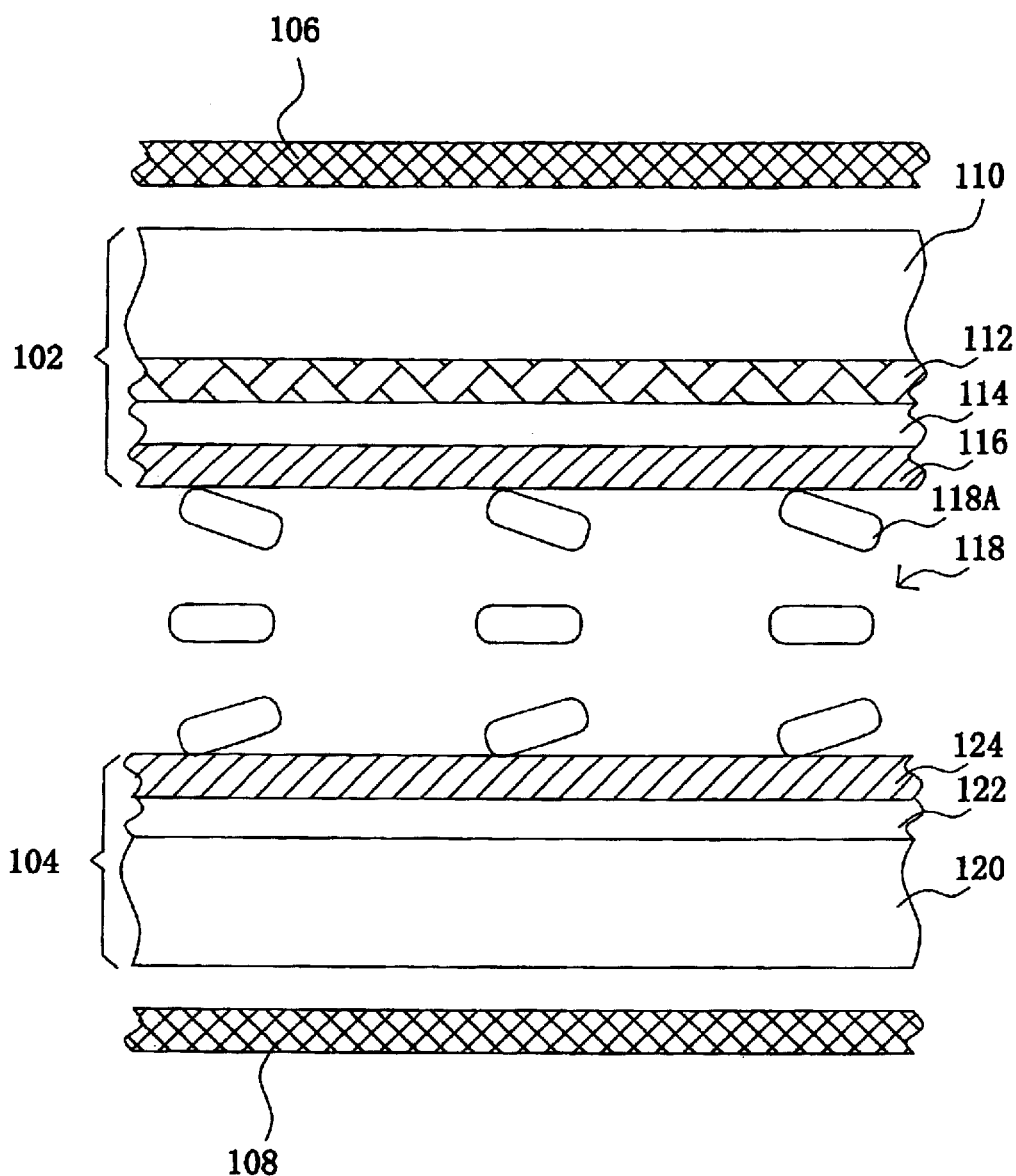
FIG. 1 is the sectional view showing the structure of a conventional LCD.
Figure 2:
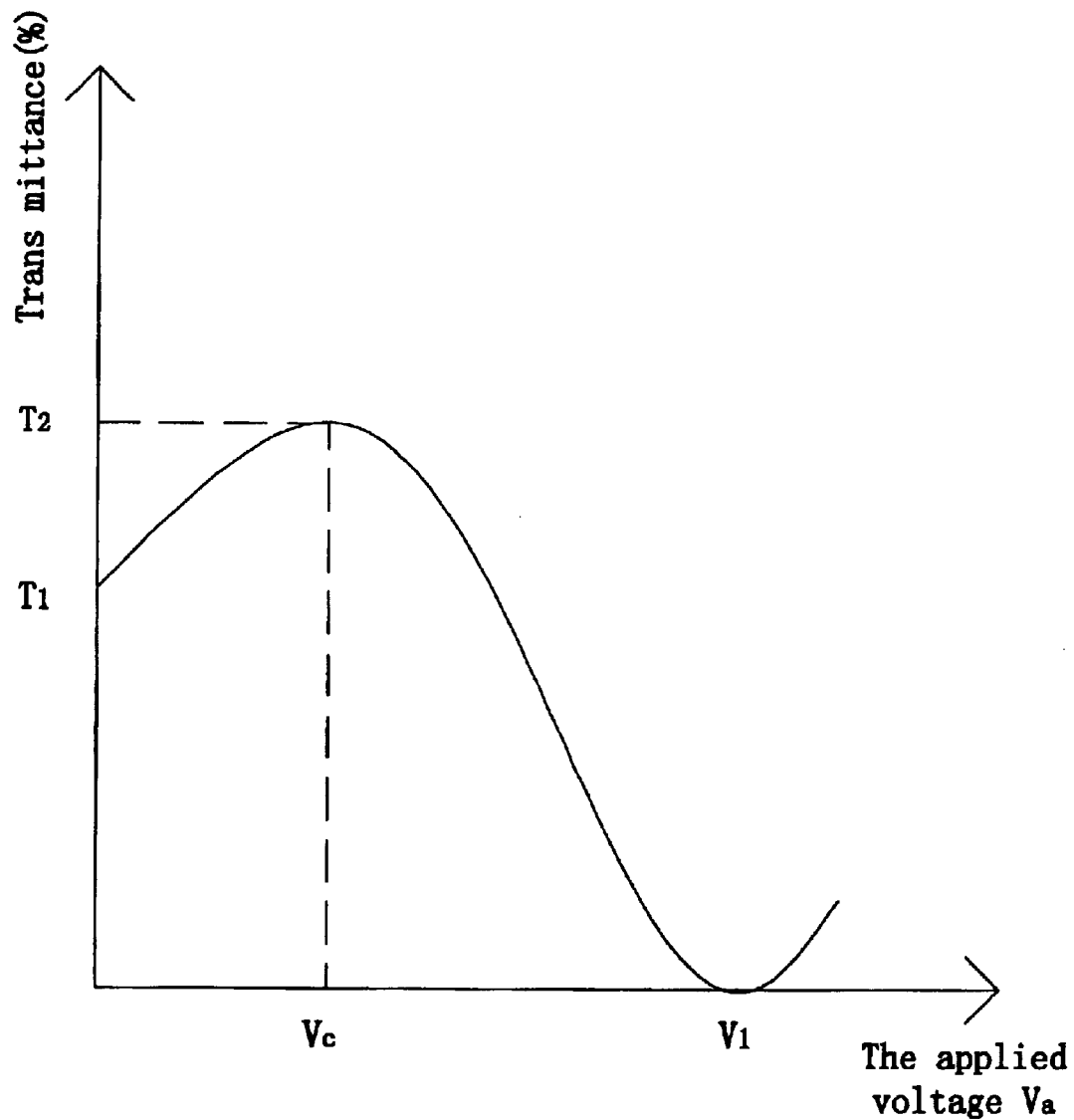
FIG. 2 shows the relation between the applied voltage Va and the transmittance of the LCD in the OCB mode.
Figure 4:
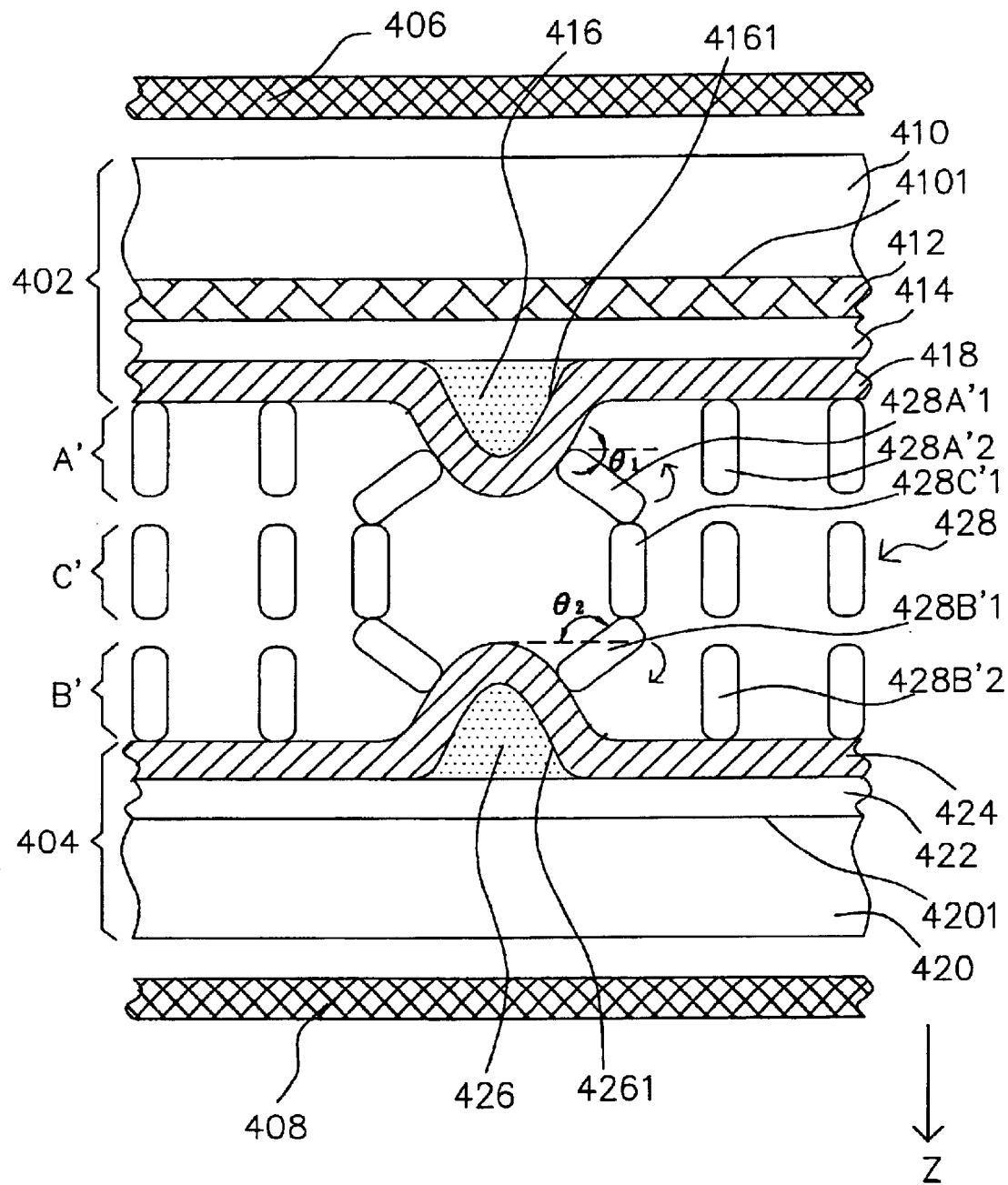
FIG. 4 is the cross-sectional view of the LCD structure according to the first embodiment of the present invention.

Referring to FIG. 4, it is the cross-sectional view of the LCD (Liquid Crystal Display) structure according to the present invention's first embodiment. The LCD has an upper plate 402 and a lower plate 404. An upper analyzer film 406 is positioned on the upper plate 402 and a lower polarizer film 408 is positioned under the lower plate 404. The polarization direction of the upper analyzer film 406 is perpendicular to that of the lower polarizer film 408. The upper plate 402 contains a first substrate 410 and the lower plate 404 contains a second substrate 420. The first substrate 410 has a first surface 4101, the second substrate 420 has a second surface 4201, and the first surface 4101 is opposite to the second surface 4201. Moreover, a color filter 412, a first electrode 414, and a first regulating device 416 are formed on the first substrate 410. In this embodiment, the first regulating device 416 is a bump 416 formed on the first electrode 414. The bump 416 is a dielectric layer with a low dielectric constant. A vertical alignment film 418 further covers the bump 416 and the first electrode 414.

A pixel electrode 422 and a second regulating device 426 are formed on the lower plate 404. In this embodiment, the pixel electrode 422 is formed on the second surface 4201 of the second substrate 420, and the second regulating device is a bump 426 on the pixel electrode 422. The bump 426 and the pixel electrode 422 are covered by the vertical alignment film 424. The liquid crystal layer 428 is sandwiched between the upper plate 402 and lower plate 404. As shown in FIG. 4, the bump 416 has at least one inclined plane 4161, and the bump 426 has at least one inclined plane 4261. The bump 426 of the second substrate 420 is opposite to the bump 416 of the first substrate 410.

The liquid crystal layer 428 includes a plurality of liquid crystal molecules with a negative anisotropic dielectric constant. The liquid crystal layer 428 has a first liquid crystal layer A', a second liquid crystal layer B', and a third liquid crystal layer C'. The first liquid crystal layer A' includes several first liquid crystal molecules, including the first liquid crystal molecules 428A'1 and 428A'2 which are contact with the vertical alignment film 418. The first liquid crystal molecule 428A'1 is in the proximity of the bump 416. The second liquid crystal layer B' contains a plurality of second liquid crystal molecules, such as the liquid crystal molecules 428B'1 and 428B'2 which are contact with the vertical alignment film 424. The second liquid crystal molecule 428B'1 is in the proximity of the bump 426. Furthermore, a plurality of third liquid crystal molecules in the third liquid crystal layer C' are sandwiched between the first liquid crystal layer A' and the second liquid crystal layer B'.

When no driving voltage is applied between the first electrode 410 and pixel electrode 420, the first liquid crystal molecule 428A'1 is perpendicular to the first inclined surface 4161. A first angle θ1, an acute angle, is formed between the first substrate 410 and the first liquid crystal molecule 428A'1. Meanwhile, the second liquid crystal molecule 428B'1 is perpendicular to the second inclined surface 4261. A second angle θ2, an obtuse angle, is formed between the first substrate 410 and the second liquid crystal molecule 428B'1. The third liquid crystal molecules 428C'1 is perpendicular to the first substrate 410. Therefore, the angle between the first liquid crystal molecules 428A'1 and third liquid crystal molecule 428C'1 and the angle between the third liquid crystal molecule 428C'1 and second liquid crystal molecule 428B'1 are both obtuse angles.

In the present invention, the dielectric constant difference of the liquid crystal molecules in the liquid crystal layer 428 is negative. In other words, the dielectric constant along a direction parallel to the long axis of the liquid crystal molecule is smaller than that perpendicular to the long axis of the liquid crystal molecule. To increase the effect of the present invention, the bumps 416, 426 are made of a low dielectric material, and the difference between the liquid crystal molecules and the bumps should be increased as large as possible.

At this time, the liquid crystal molecules are in a vertical arrangement, in other words, are perpendicular to the upper analyzer film 406 and lower polarizer film 408. Therefore, no light (not shown in Figure) can pass through the upper analyzer film 406 and the lower polarizer film 408 as no driving voltage is applied. The LCD is in a better dark state.

Figure 5:
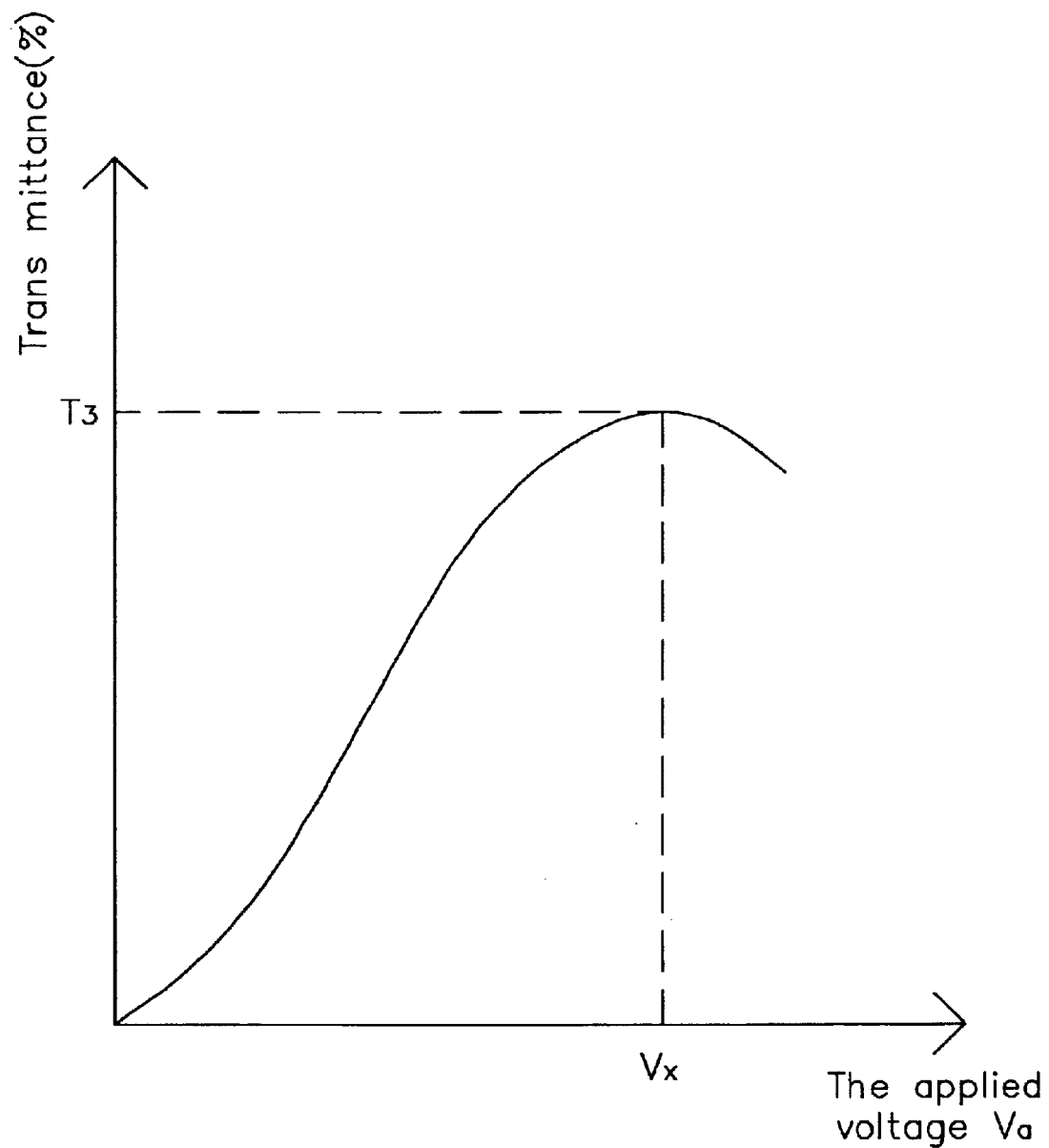
FIG. 5 shows the relation between the applied voltage Va and the transmittance of the LCD according to the present invention.

Referring to FIG. 5, it shows the relation between the applied voltage Va and the transmittance of the LCD. As the voltage Va between the first electrode 414 and the pixel electrode 422 is 0, the LCD is in the dark state, and the transmittance is zero. If the voltage Va applied between the first electrode 414 and the pixel electrode 422 is Vx, the transmittance will be at a maximum T3. As shown in FIG. 5, the transmittance will be increased as the applied voltage Va becomes larger. Hence, the gray scale of the LCD display can be accomplished by adjusting the applied voltage properly.

Figure 6:
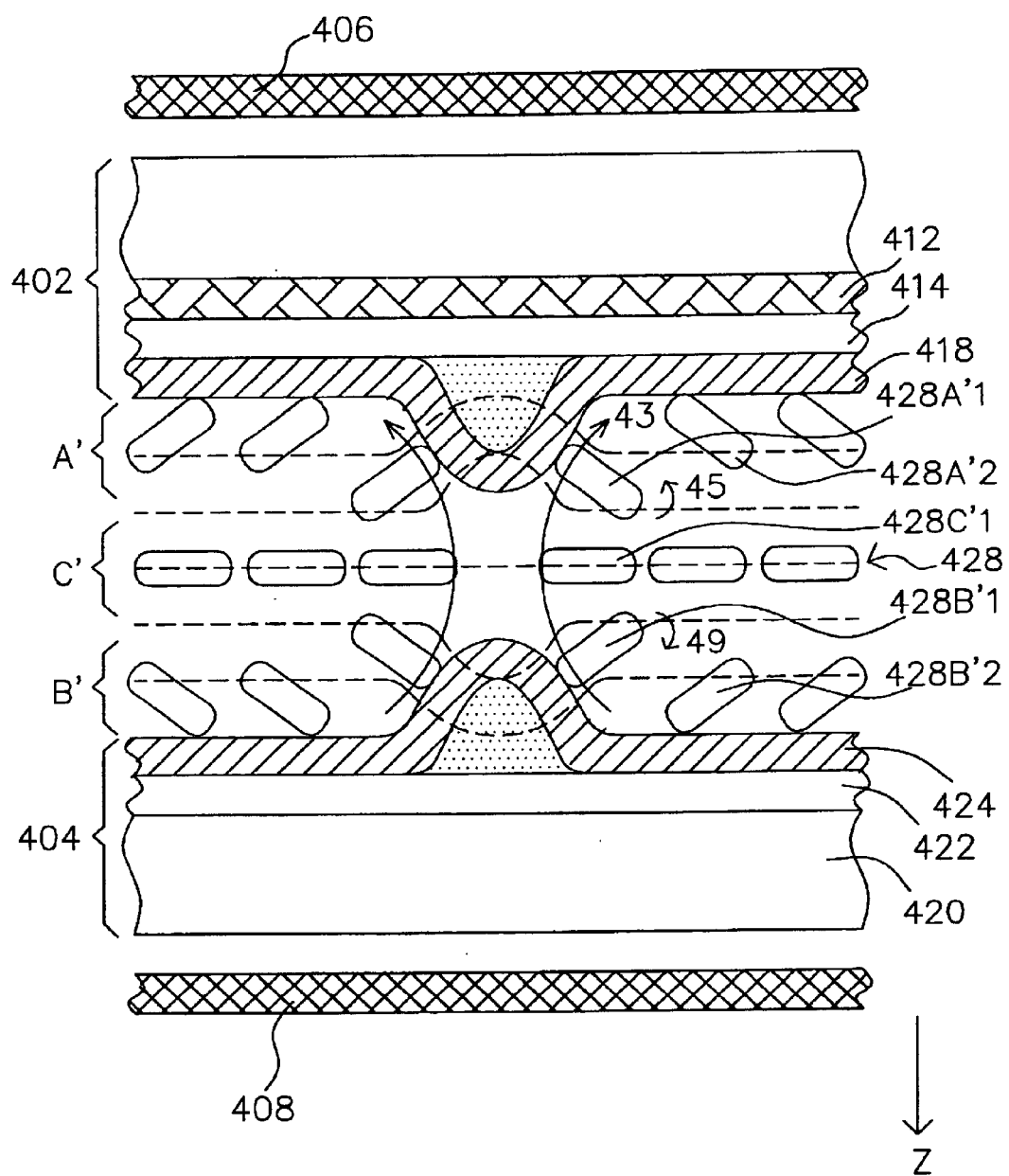
FIG. 6 is the cross-sectional view of the LCD structure according to FIG. 4 when a voltage Vx is applied between the first electrode and the pixel electrode.

Referring to FIG. 6, it is the cross-sectional view of the LCD (Liquid Crystal Display) structure according to FIG. 4 when a voltage Vx is applied across the first electrode and the pixel electrode. When the voltage Vx is applied between the first electrode 414 and the pixel electrode 422, the orientation of the liquid crystal layer 428 will be changed according to the voltage Vx. In FIG. 6, the dash line is the equipotential line of an electric field formed between the first electrode 414 and the pixel electrode 422 while the voltage Vx is applied. The arrow indicates the direction of the electric field. Because the dielectric constant is negative, the liquid crystal molecules in the third liquid crystal layer C'0 will rotate along the electric field, and the long axis of each liquid crystal molecule will be vertical to the electric field. In addition, the liquid crystal molecules 428A'1 in the first liquid crystal A' will rotate until the long axis of the liquid crystal molecules 428A'1 is perpendicular to the electric field after the voltage Vx applied. Because the liquid crystal molecules are very close to each other, the liquid crystal molecules 428A'1 will induce the neighboring liquid crystal molecules in the first liquid crystal layer A', such as the liquid crystal molecule 428A'2, to rotate to the similar direction. According to the same reason, all of the liquid crystal molecules in the second liquid crystal layer B', such as the liquid crystal molecule 428B'2, will rotate in the similar direction of the liquid crystal molecule 428B'1.

In other words, a driving electric field 43 with oblique shape is formed between the first substrate 410 and the second substrate 420 because of the bumps 416 and 426 when the voltage is applied across the first electrode 414 and the pixel electrode 422. Therefore, the first liquid crystal molecule 428A'1 will rotate along the first direction 45, and the second liquid crystal molecule 428B'1 will rotate along the second direction 49. The orientation of the first direction 45 is opposite to the second direction 49, all of the liquid crystal molecules 428A'1, 428B'1 and 428C'1 will rotate to parallel to the first substrate 410.

In this time, most of the liquid crystal molecules are parallel to the first electrode 414 and the pixel electrode 422, and angles are formed among the liquid crystal molecules and the upper analyzer film 406, the lower polarizer film 408. After the driving voltage is applied, the light (not shown in Figure) can pass thought the lower polarizer film 408 and the upper analyzer film 406. Therefore, the LCD is in a white state.

Compared with the present invention and the conventional LCD, the arrangements of the liquid crystal molecules in FIG. 3C and that in FIG. 4 are similar when the LCD is in the dark state. The liquid crystal molecules are arranged in a 7 shape. In addition, the arrangements of the liquid crystal molecules in FIG. 3A are similar with those in FIG. 6 when the LCD is in the white state. The long axis of the liquid crystal molecules is parallel to the pixel electrode. However, one voltage is needed in FIG. 3C but no voltage is needed in FIG. 4 when the LCD is in the dark state. Further, no voltage is needed in FIG. 3A but one voltage is needed in FIG. 6 when the LCD is in the write state. The operation in the present invention is counter to that of the OCB mode in the conventional LCD. Therefore, the LCD in the present invention can be deemed as a LCD having a reverse OCB mode.

Figure 7:
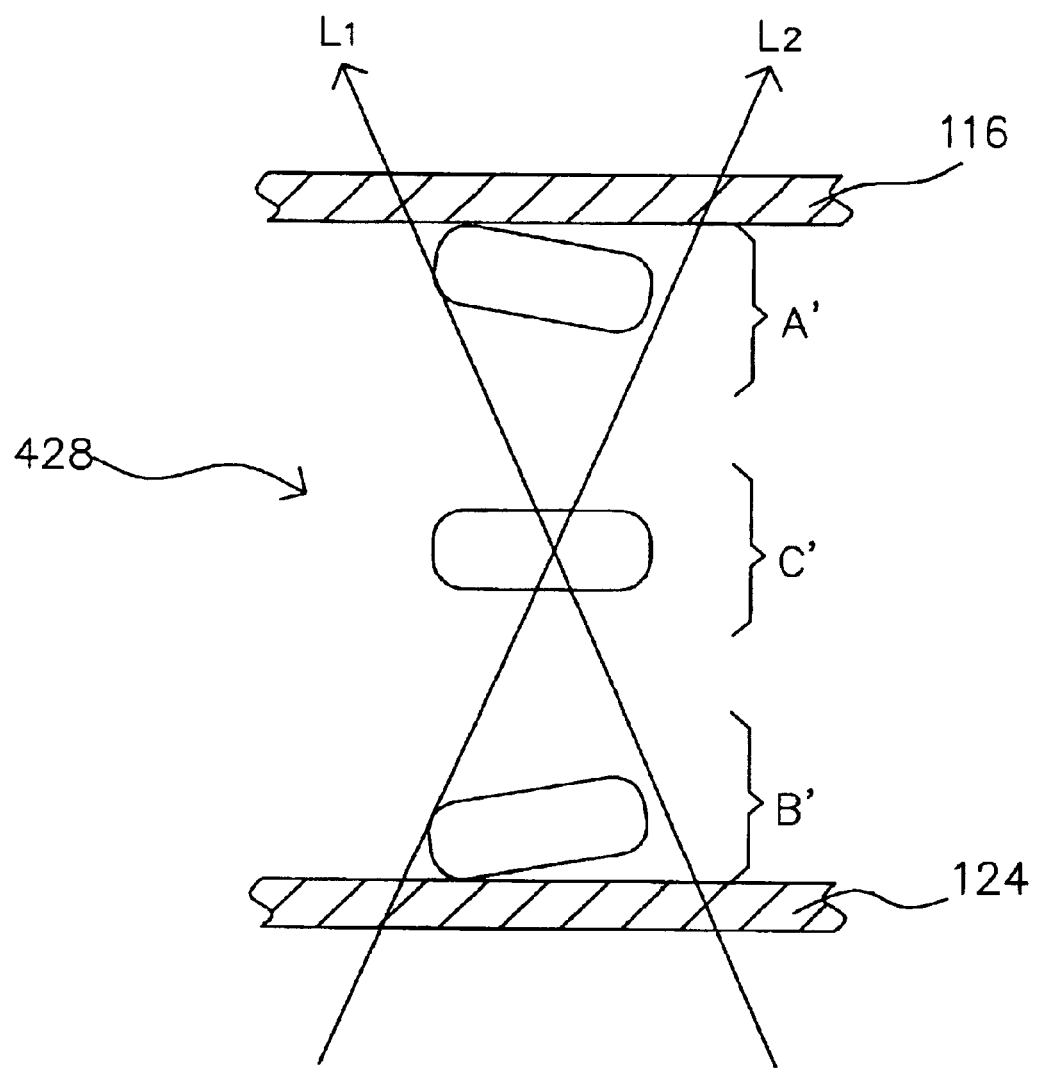
FIG. 7 shows the relation between the liquid crystal molecules and the incident light according to FIG. 6.

Referring to FIG. 7, it shows the relation between the liquid crystal molecules and the incident light according to FIG. 6. The arrangement of the liquid crystal molecules in the first liquid crystal layer A' is symmetrical to that of the liquid crystal molecules in the second liquid crystal layer B'. Therefore, the effects to these liquid crystal molecules are the same as the light L1 and light L2 pass the liquid crystal layer 428, respectively. Accordingly, when watching from the right side and the left side of the LCD, the brightness shown on the display are the same, and the viewing angle is increased in the present invention.

After the voltage is applied, the arrangement of the liquid crystal molecules in FIG. 4 is changed to that in FIG. 6, the rotating directions of liquid crystal molecules in the upper lower liquid crystal layer is inverse to that in the lower liquid crystal layer. One rotates clockwise and the other rotates counterclockwise. Therefore, the friction between these liquid crystal molecules will be small and the response speed of the liquid crystal molecules will be increased. In the conventional LCD, including TN (Twisted Nematic mode) type or VA (Vertical alignment mode) type, all liquid crystal molecules rotate toward the same direction, the clockwise or the counter clockwise. The frictions between the liquid crystal molecules in the upper and lower layer are large, and the response speed is slow.

Moreover, as shown in FIG. 6, the curvature of the electric field near the bump 416 and 426 is large, the strength for rotating the liquid crystal molecules is enhanced, and the response speed of the liquid crystal molecules is increased.

Figure 8A:
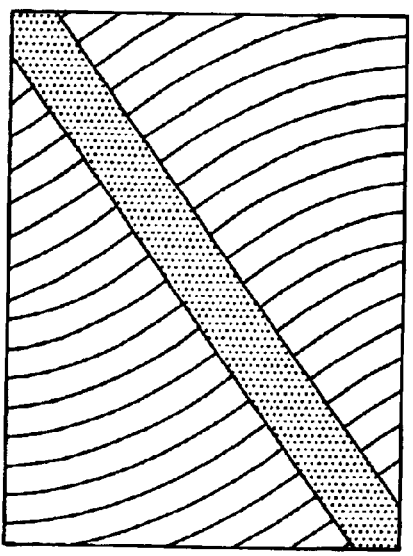
FIGS. 8A~8D are the top views showing the shape of the bump in one pixel area and the arrangement of the liquid crystal molecules according to the present invention.
Figure 8B:
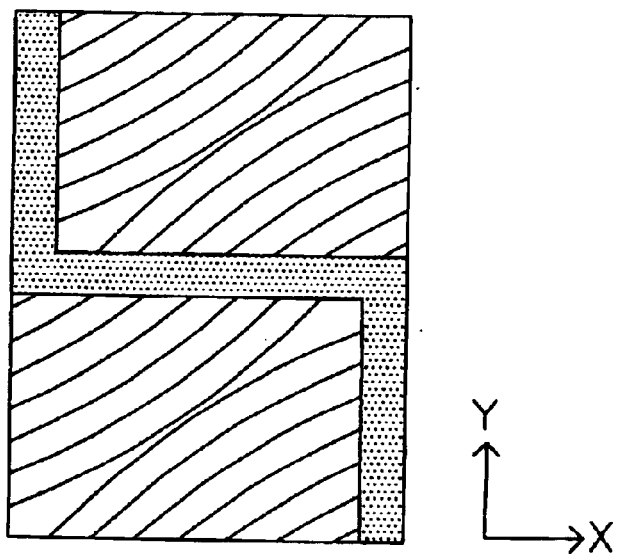
Figure 8C:
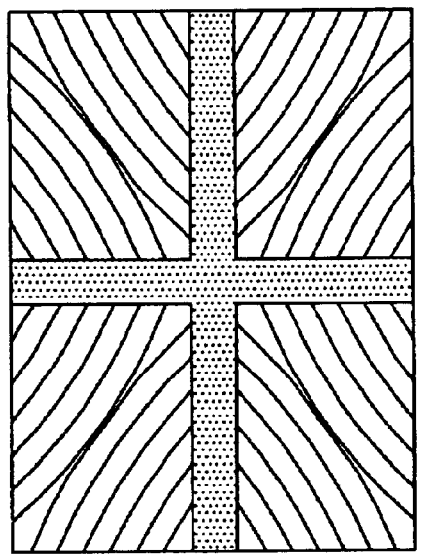
Figure 8C:
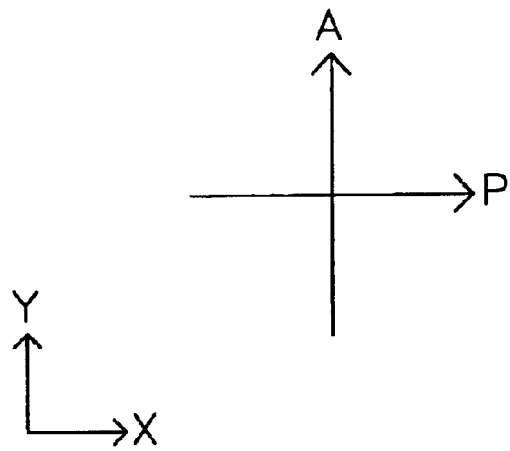
Figure 8D:
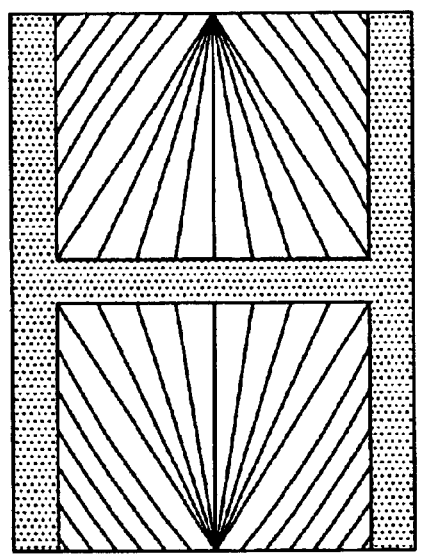
Figure 8D:
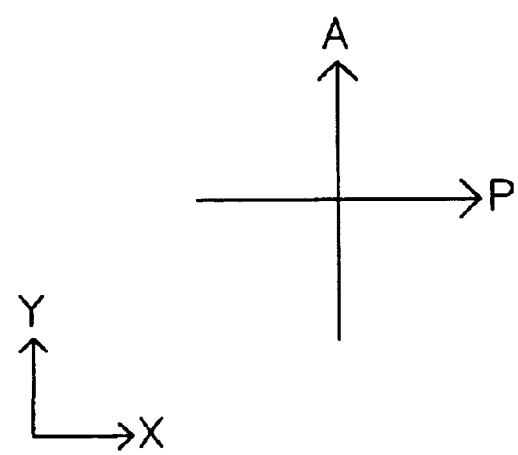

Please referring to FIGS. 8A~8D which are top views showing the shape of the bump in one pixel are and the arrangement of the liquid crystal molecules according to the present invention. The pixel area means a space between the first and second substrates 410, 420 and corresponded to the pixel electrode. The bump 416 overlaps the bump 426 and is represented in FIGS. 8A~8D by the white region. Referring to FIG. 4 at the same time, the upper plate 402 and the lower plate 404, extending along the XY plane, include a plurality of pixel areas thereon. In each pixel area, the bump 416 and bump 426 of the first and second regulating device divide each pixel area to some domains. After the voltage applied, the liquid crystal molecules in the pixel area will lean toward different directions, and different lean directions of the liquid crystal molecules mean different display areas. FIGS. 8A, 8B and 8D show the LCD having two display areas, and FIG. 8C shows the LCD having four display areas. The viewing angle of the LCD can be improved by using different display areas or increasing the number of the display areas.

As shown in FIG. 8A–8D, the direction A indicates the polarization direction of the upper analyzer film 406 and the direction P indicates the polarization direction of the low porlarizer film 408. The polarization directions of upper analyzer film 406 and lower polarizer film 408 can be exchanged. The bump in FIG. 8A is formed along the diagonal of a pixel area, the bump of FIG. 8C is formed in a shape of a cross, and the bump in FIG. 8D is formed as an H shape. However, the embodiments in the present invention will not be the limitation of the scope. Any method to form different display areas by bumps will fall in the scope of the present invention.

Second Embodiment

Bumps are used to form an oblique electric field in FIG. 4 and FIG. 6. However, the scope of the present invention includes any method to form an oblique electric field between the first electrode 414 and the pixel electrode 426.

Figure 9A:
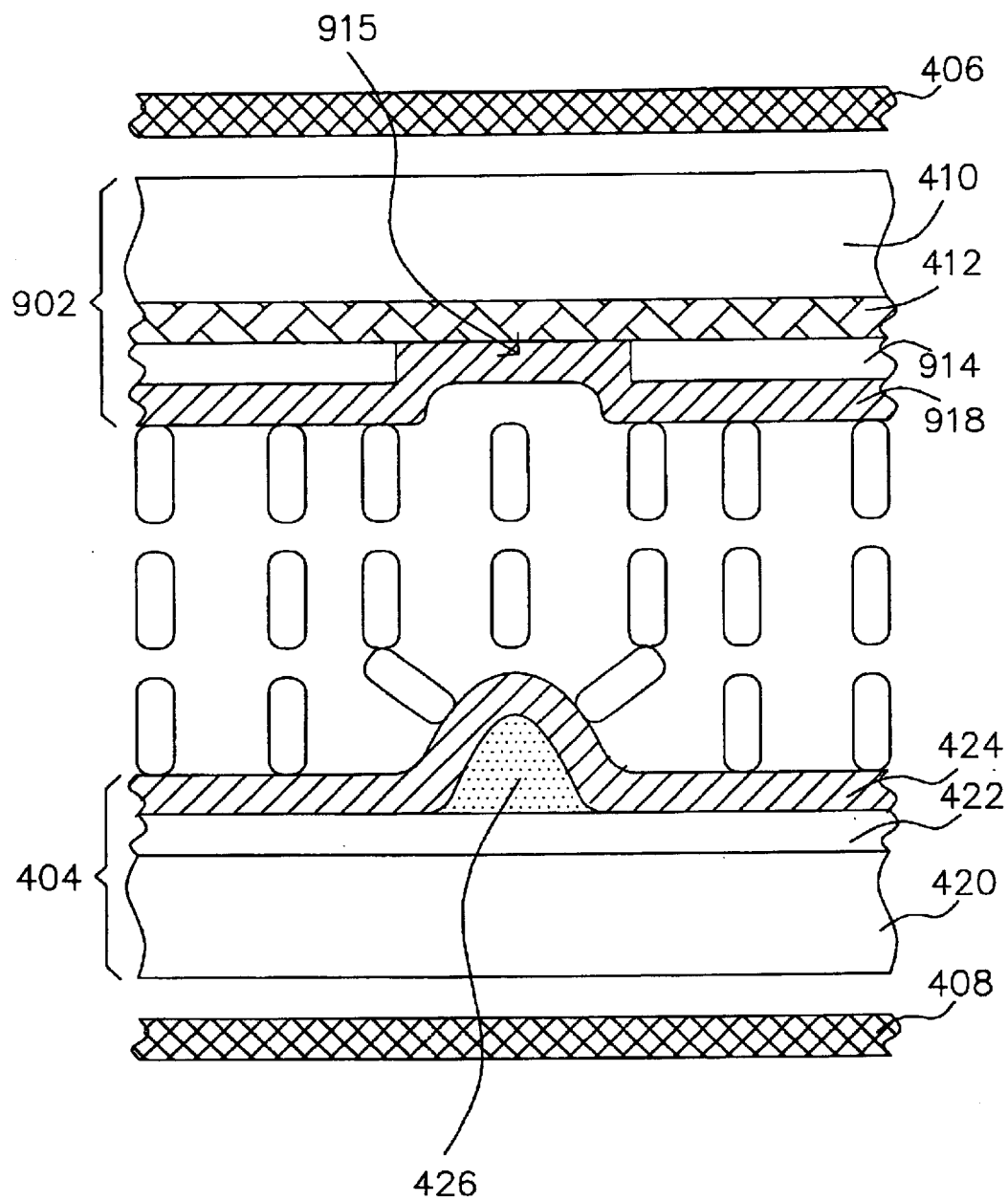
FIGS. 9A~9B are the cross-sectional views of the LCD according the second embodiment in the present invention.
Figure 9B:
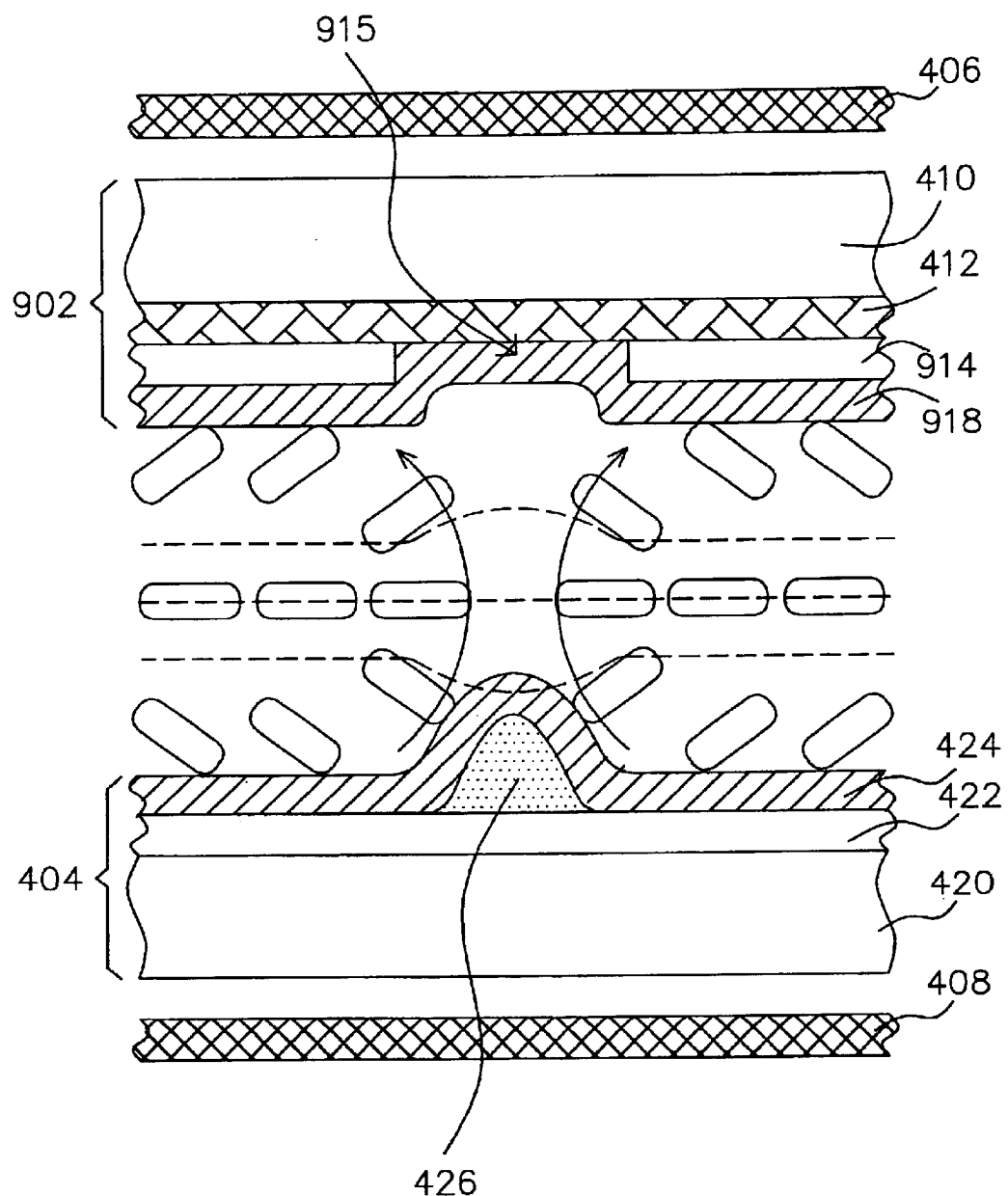

Referring to FIGS. 9A and 9B, they are the cross-sectional view of the LCD according the second embodiment in the present invention. In FIGS. 9A~9B, the same numbers are used to indicate the identical parts as shown in FIG. 4. No voltage is applied in FIG. 9A and at least one voltage is applied in FIG. 9B. In the upper plate 902, a slit 915 is formed on the first electrode 914, and a vertical alignment film 918 covers the slit 915 and the first electrode 914. The structure of the lower plate 404 is the same as the first embodiment in FIG. 4. As shown in FIG. 9B, when a voltage is applied, a curved electric field is produced by the opposing bump 426 and slit 915, and the purpose of the present invention is accomplished.

Third Embodiment

Figure 10A:
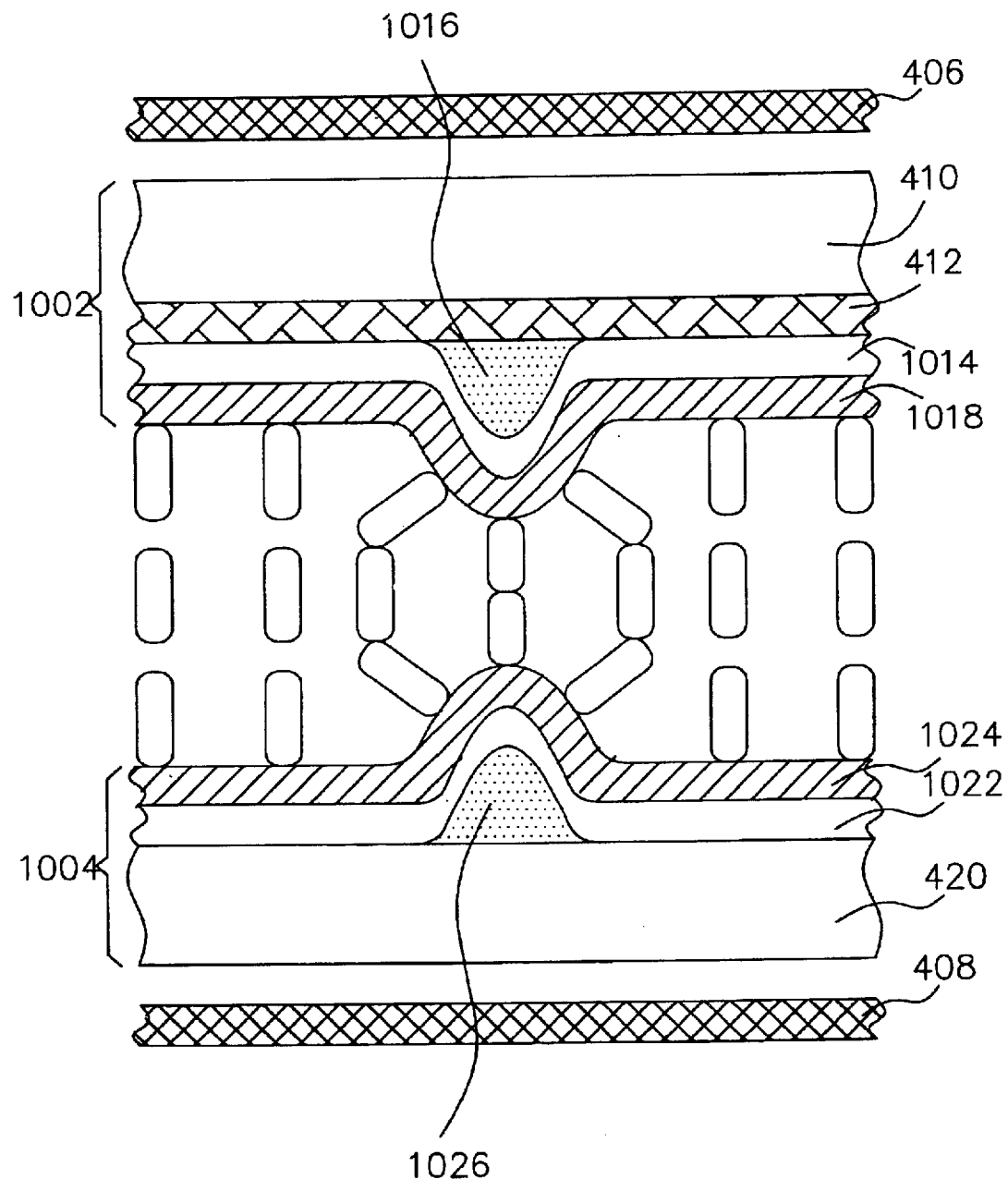
FIGS. 10A~10B are the cross-sectional views of the LCD according the third embodiment in the present invention.
Figure 10B:
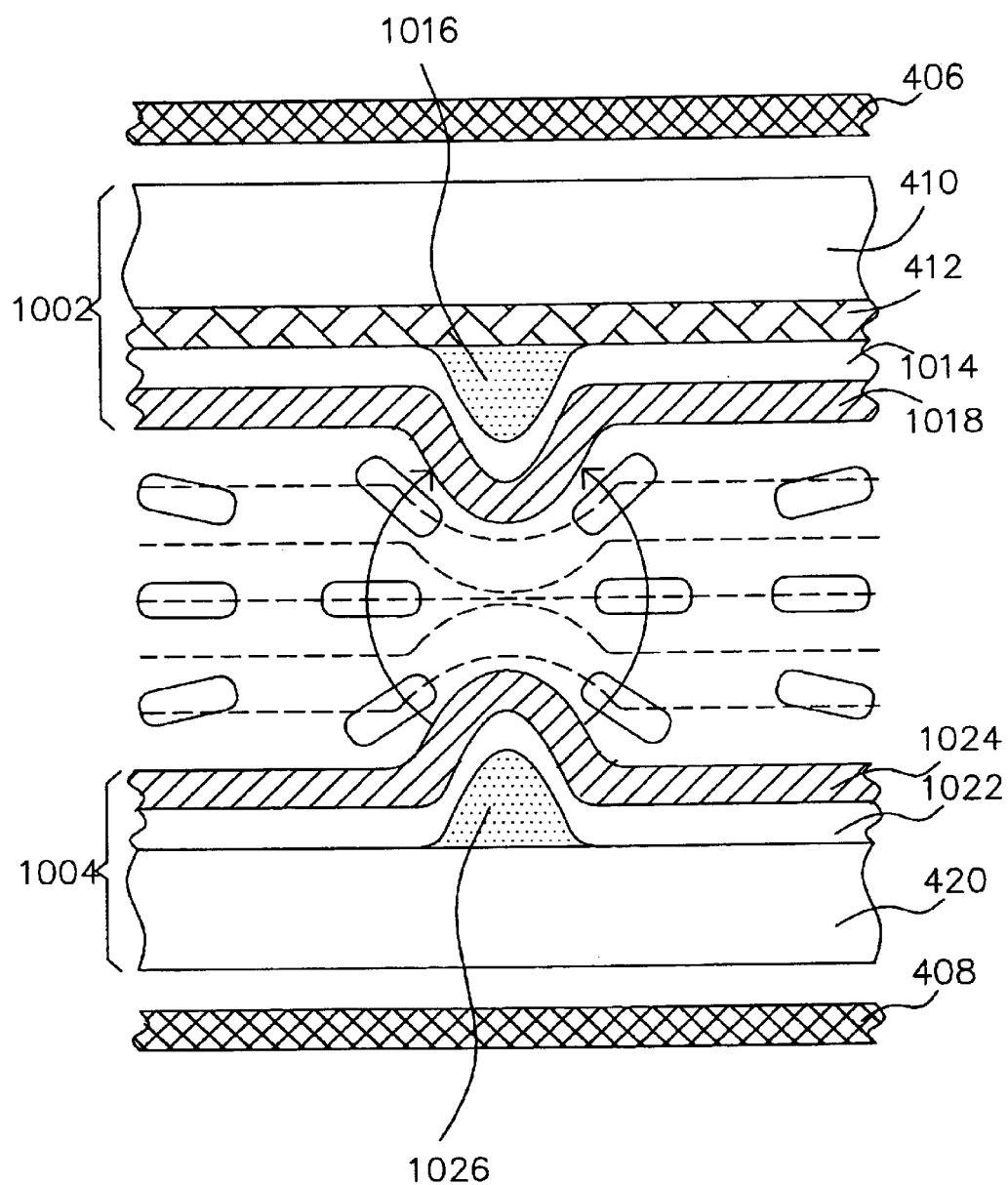

Referring to FIGS. 10A and 10B, they are the cross-sectional view of the LCD according the third embodiment in the present invention. In FIGS. 10A~10B, the same numbers are used to indicate the identical parts as shown in FIG. 4. FIGS. 10A and 10B show the arrangement of the liquid crystal molecules without and with a voltage applied in the LCD. In the upper plate 1002, a bump 1016 is formed on the color filter 412, a first electrode 1014 is formed on the color filter 412, and a vertical alignment film 1018 further covers the first electrode 1014. In the lower plate 1004, the bump 1026 formed on the second substrate 420 is opposite to the bump 1016, a pixel electrode 1022 is further formed on the bump 1026. There's a difference between the first embodiment and the third embodiment. For the first embodiment, the bump is formed on the electrode. However, for the third embodiment, the bumps 1016, 1026 are formed below the first electrode 1014 and the pixel electrode 1022, respectively. As shown in FIG. 10B, a curved electric field is produced by the bump 1016 and 1026, and the purpose of the present invention is accomplished.

Fourth Embodiment

Figure 11A:
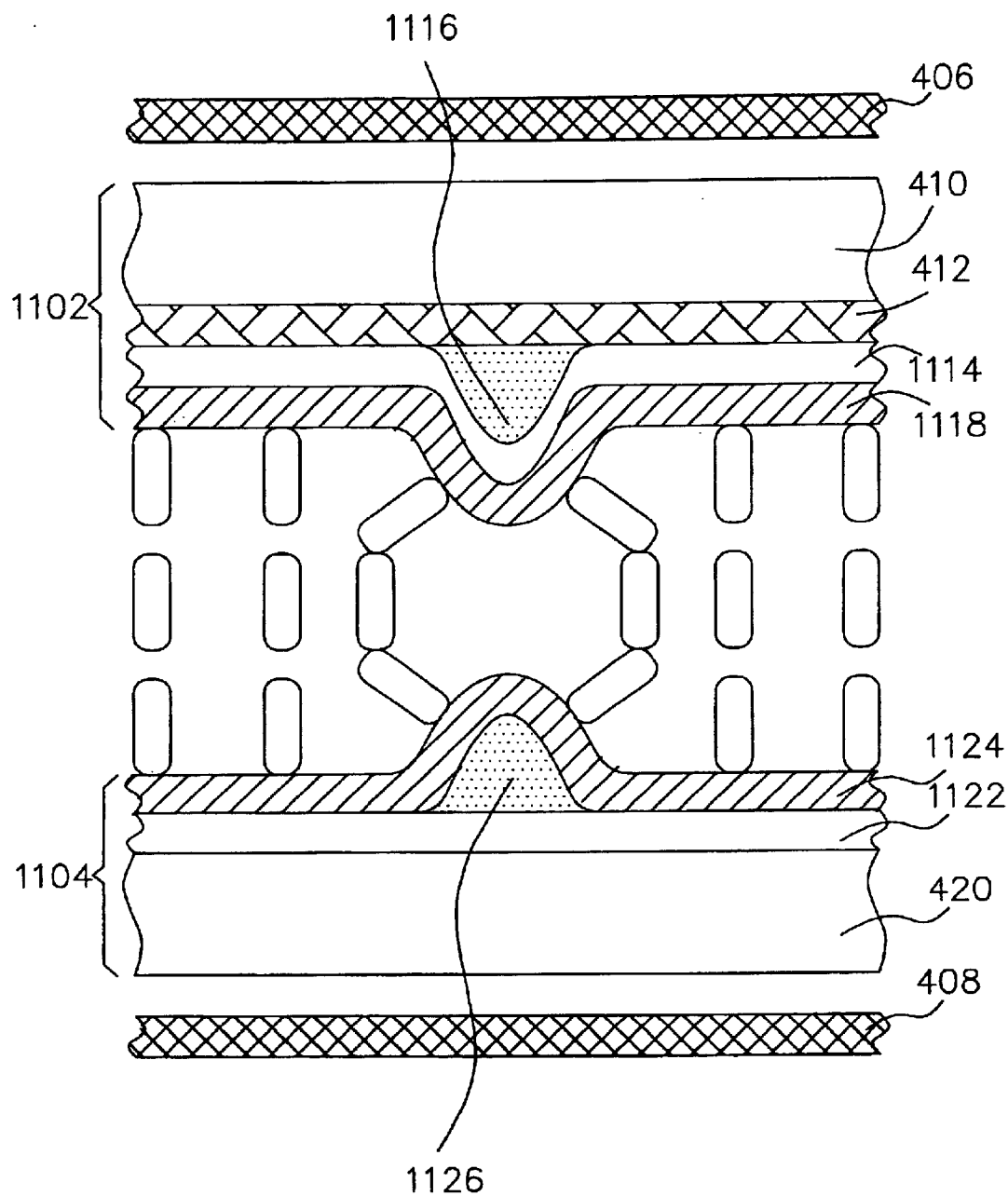
FIGS. 11A~11B are the cross-sectional views of the LCD according the fourth embodiment in the present invention.
Figure 11B:
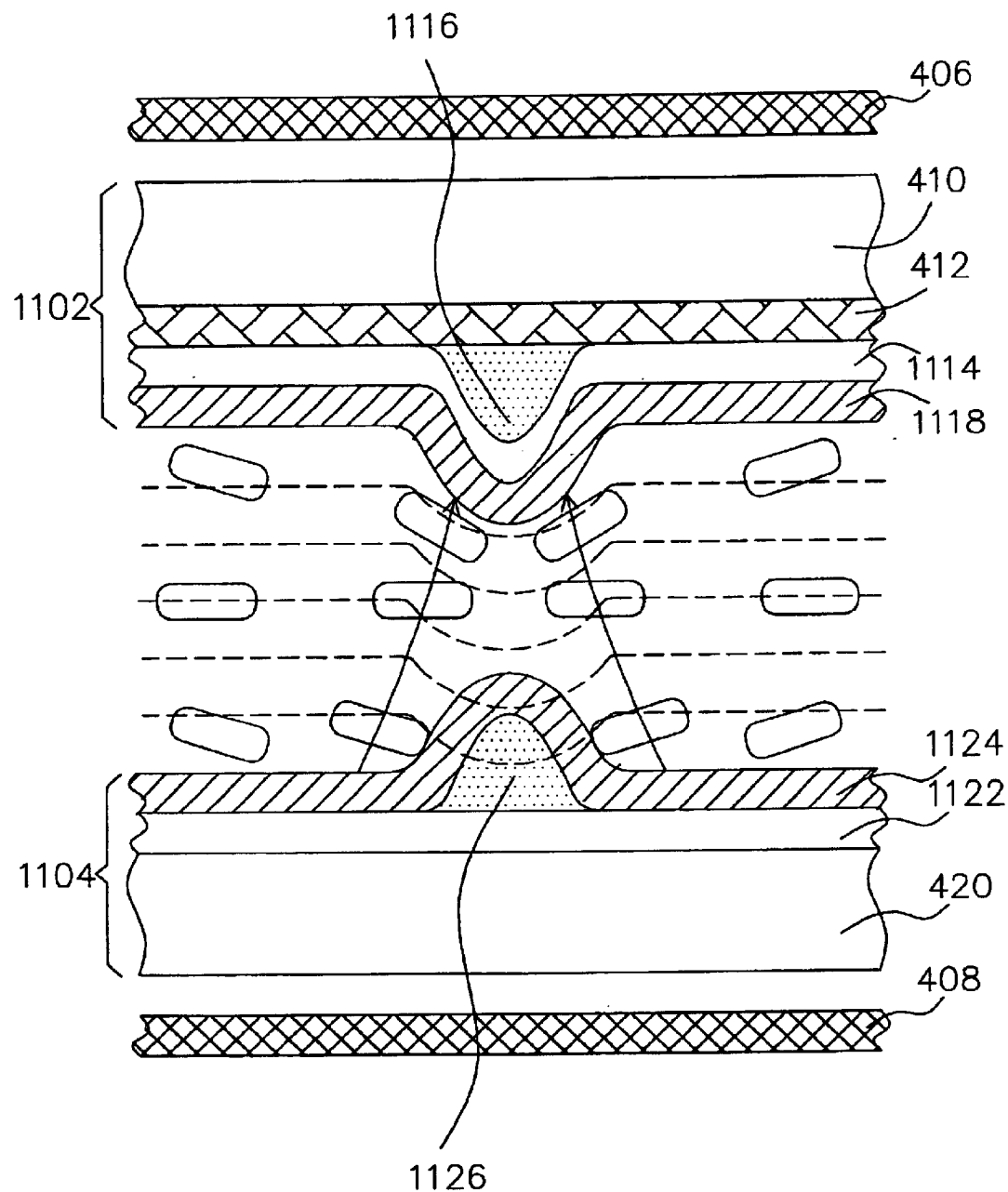

Referring to FIGS. 11A and 11B, they are the cross-sectional view of the LCD according the fourth embodiment in the present invention. In FIGS. 11A~11B, the same numbers are used to indicate the identical parts as shown in FIG. 4. FIGS. 11A and 11B show the arrangement of the liquid crystal molecules without and with a voltage applied in the LCD. In the upper plate 1102, a bump 1116 is formed on the color filter 412, a first electrode 1114 is formed on the color filter 412, and a vertical alignment film 1118 covers the first electrode 1114. In the lower plate 1104, the bump 1126 opposed to the bump 1116 is formed on the pixel electrode 1122, and a vertical alignment film 1124 is further formed on the pixel electrode 1122. The design of the fourth embodiment is different from that of the first or third embodiment. In the fourth embodiment, the bump 1116 regarded as the first regulating device is positioned under the first electrode 1114, and the bump 1126 regarded as the second regulating device is formed on the pixel electrode 1022. As shown in FIG. 11B, an oblique electric field is produced by the bump 1116 and 1126 after a voltage is applied, and the purpose of the present invention can be come true.

Fifth Embodiment

Figure 12:
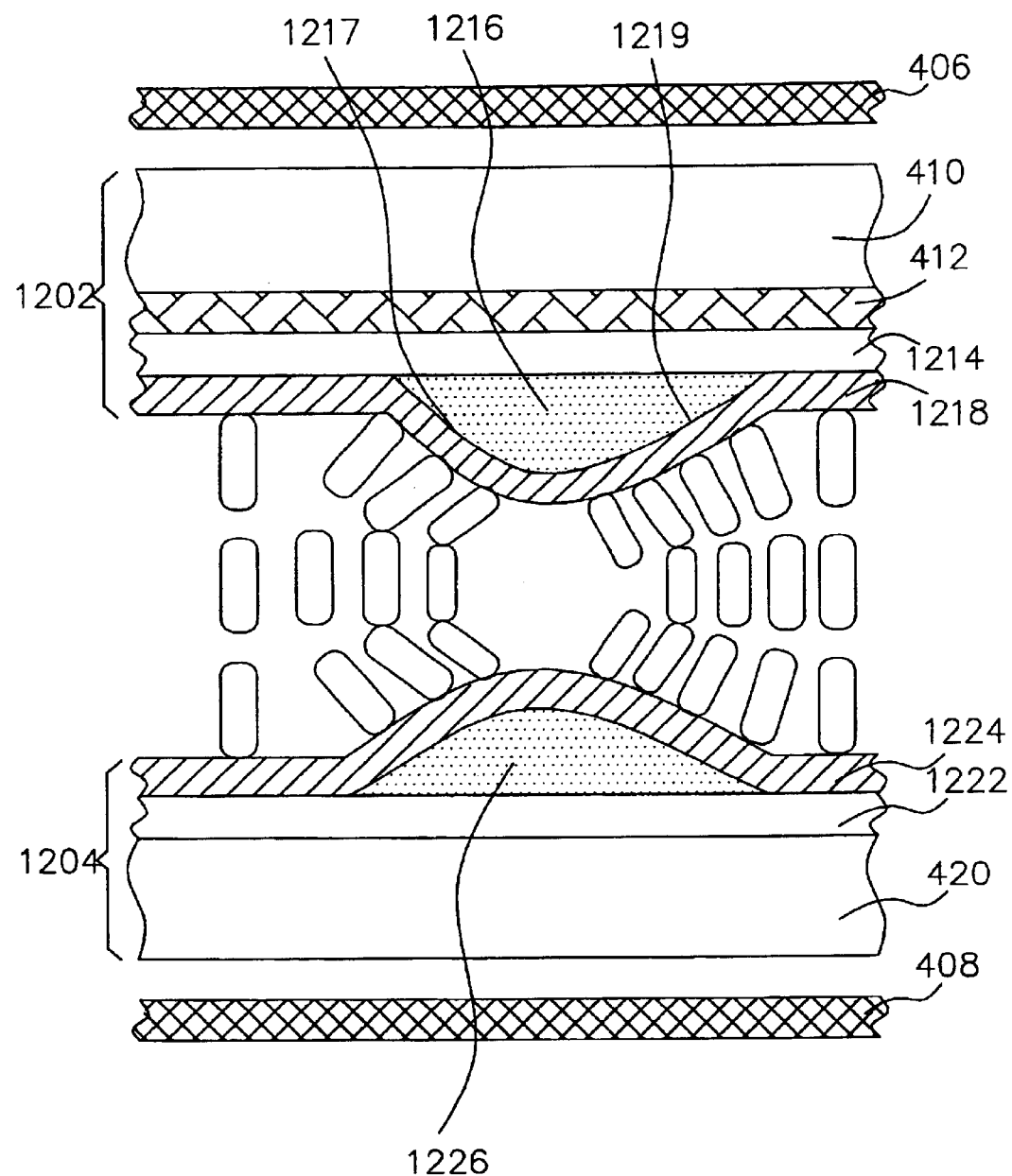
FIG. 12 is the cross-sectional view of the LCD according the fifth embodiment in the present invention.

Referring to FIG. 12, it is the cross-sectional view of the LCD according the fifth embodiment in the present invention. In FIG. 12, the same numbers arc used to indicate the identical parts as shown in FIG. 4. No voltage is applied in FIG. 12. A bump 1216 is formed on the first electrode 1214, a bump 1226 is formed on the pixel electrode 1222. The bump 1226 is opposite to the bump 1216. Moreover, the bump 1216 regarded as the first regulating device has two inclined planes 1217, 1219 and the slope of these two inclined planes are different. The bump 1226 of the second regulating device also has two inclined planes with different slope. Therefore, by the different slopes of these two bumps 1216 and 1226, the liquid crystal molecules position by the two sides of each bump will be aligned to different direction, and different display areas will be formed after a voltage is applied.

Sixth Embodiment

Figure 13:
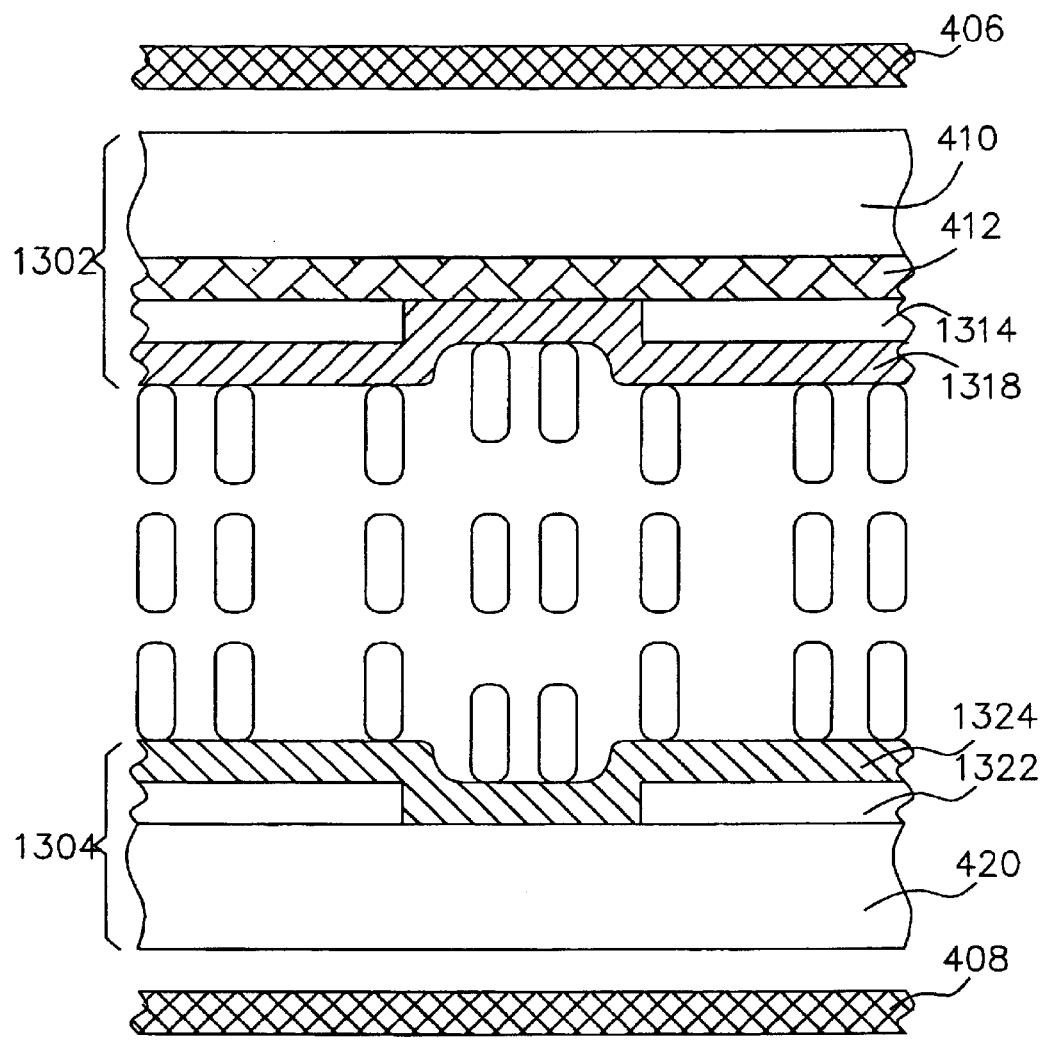
FIG. 13 is the cross-sectional view of the LCD according the sixth embodiment in the present invention.

FIG. 13 is the cross-sectional view of the LCD according the sixth embodiment in the present invention. In FIG. 13, the same numbers are used to indicate the identical parts as shown in FIG. 4. No voltage is applied in FIG. 13. Two opposing slits are formed on the first electrode 1314 and the pixel electrode 1322, the vertical alignment film 1318 and 1324 cover the first electrode 1314 and the pixel electrode 1322. Therefore, an oblique electric field is formed because of the slits of the first electrode 1314 and pixel electrode 1322 after a voltage is applied, and the purpose of the present invention is accomplished.

Seventh Embodiment

Figure 14:
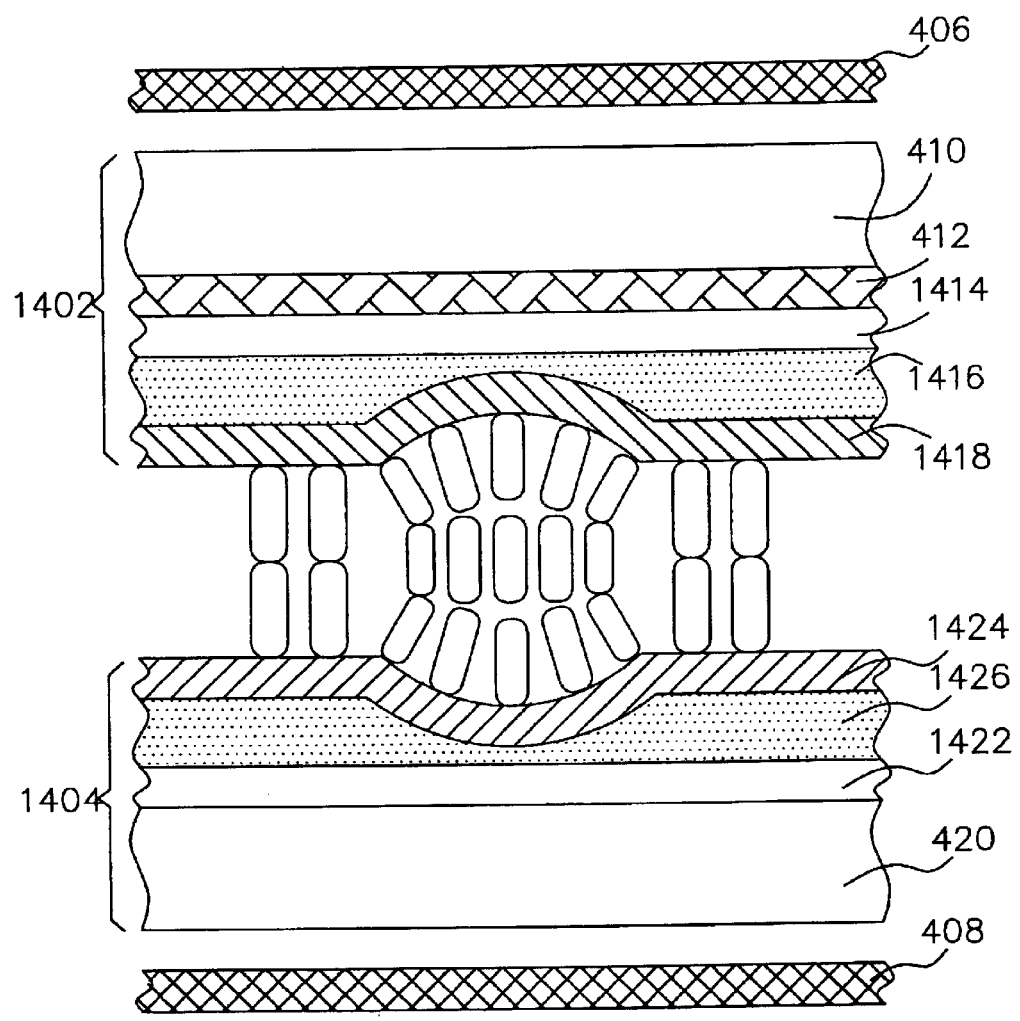
FIG. 14 is the cross-sectional view of the LCD according the seventh embodiment in the present invention.

FIG. 14 is the cross-sectional view of the LCD according the seventh embodiment in the present invention. In FIG. 14, the same numbers are used to indicate the identical parts as shown in FIG. 4. No voltage is applied in FIG. 14. Two opposing recessions of the dielectric layer 1416 and 1426 are formed. The dielectric layer 1416 is positioned between the first electrode 1414 and vertical alignment film 1418. The dielectric layer 1426 is positioned between the pixel electrode 1422 and the vertical alignment electrode 1424. Therefore, an oblique electric field is formed because of the recessions of the dielectric layer 1416 and 1426 after a voltage is applied, and the purpose of the present invention is accomplished In the present invention, the LCD with a wide viewing angle includes the advantages of the VA mode LCD and the OCB mode LCD. These advantages include a wide viewing angle, a fast response speed, a high contrast ratio, and a perfect dark state without applied voltage.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A Liquid Crystal Display (LCD) with a wide viewing angle, the LCD comprising:

a first substrate including a first surface thereon;

a first electrode and a first regulating device having formed on said first surface of said first substrate, and said first regulating device having a first inclined plane;

a second substrate including a second surface thereon, and said first surface being opposed to said second surface;

a pixel electrode and a second regulating device formed on said second surface of said second substrate, said second regulating device having a second inclined plane on said second surface, and said first regulating device opposing to said second regulating device; and a liquid crystal layer formed between said first substrate and said second substrate, said liquid crystal layer having a plurality of liquid crystal molecules with a negative anisotropic dielectric constant, said liquid crystal layer comprising a first liquid crystal molecule in the proximity of said first regulating device, a second liquid crystal molecule in the proximity of said second, and a third liquid crystal molecule between said first and second liquid crystal molecules;

wherein as no driving voltage is applied between said first electrode and said pixel electrode, (a) said flat liquid crystal molecule is perpendicular to the first inclined surface, a first angle is formed between said first substrate and said first liquid crystal molecule, and the first angle is an acute angle, (b) said second liquid crystal molecule is perpendicular to the second inclined surface, a second angle is formed between said first substrate and said second liquid crystal molecule, and the second angle is an obtuse angle, (c) said third liquid crystal molecule is perpendicular to the first substrate, therefore, the angle between the first and third liquid crystal molecules and the angle between the third and second liquid crystal molecules are both obtuse angles;

while the driving voltage is applied between said first electrode and said pixel electrode, an oblique electric field is formed between said first substrate and said second substrate because of said first regulating device and said second regulating device, said first liquid crystal molecule rotates along a first direction, said second liquid crystal molecule rotates along a second direction, said first direction is contrary to said second direction, so that said plurality of liquid crystal molecules of the liquid crystal layer are substantially parallel to said first substrate because of said oblique electric field.

2. The liquid crystal display of claim 1, wherein said first regulating device is a first bump formed on said first electrode, said second regulating device is a second bump formed on said pixel electrode, and said second bump is positioned below said first bump.

3. The liquid crystal display of claim 2, wherein said first bump and said second bump are made of a low dielectric constant material.

4. The liquid crystal display of claim 2, wherein said first bump further comprises a third inclined plane and said second bump further comprises a fourth inclined plane, said first, second, third, and fourth inclined planes have a first, second, third, fourth slopes, said first slop is different from said third slope, and said second slope is different from said fourth slope.

5. The liquid crystal display of claim 1, wherein said first regulating device is a first bump formed on said first substrate and covered by said first electrode, said second regulating device is a second bump formed on said pixel electrode, and said first bump and said second bump are made of a low dielectric constant material.

6. The liquid crystal display of claim 1, wherein said first regulating device is a first bump formed on said first substrate and covered by said first electrode, said second regulating device is a second bump formed on said second substrate and covered by said pixel electrode, and said first bump and said second bump are made of a low dielectric constant material.

7. The liquid crystal display of claim 1, wherein said first substrate further comprises a first dielectric layer and said second substrate further comprises a second dielectric layer, said first regulating device is a first recess in said first dielectric layer and said second regulating device is a second recess in said second dielectric layer, said second recess is opposed to said first recess, said first dielectric layer is formed above said first electrode, and said second dielectrode layer is formed above said pixel electrode.

8. The liquid crystal display of claim 1, wherein a pixel area is defined as the space between said first substrate and said second substrate, and said first regulating device and said second regulating device divide said pixel area to a plurality of domains.

9. The liquid crystal display of claim 8, wherein said first regulating device and said second regulating device are formed along the diagonals of said pixel area.

10. The liquid crystal display of claim 8, wherein said first regulating device and said second regulating device are in L shape within said pixel area.

11. The liquid crystal display of claim 8, wherein said first regulating device and said second regulating device form a cross shape in said pixel area.

12. The liquid crystal display of claim 8, wherein said first regulating device and said second regulating device form an H shape in said pixel area.

13. A wide viewing angle LCD (Liquid Crystal Display) comprising:
- a first substrate including a first surface thereon;
- a first electrode and a first regulating device formed on said first surface of said first substrate;
- a second substrate including a second surface thereon, and said second surface being opposed to said first surface;
- a pixel electrode and a second regulating device formed on said second surface of said second substrate, said second regulating device being opposed to said first regulating device; and
- a liquid crystal layer formed between said first substrate and said second substrate, said liquid crystal layer having a plurality of liquid crystal molecules with a negative anisotropic dielectric constant, said liquid crystal layer comprising a first liquid crystal molecule in the proximity of said first regulating device, a second liquid crystal molecule in the proximity of said second regulating device, and a third liquid crystal molecule between said first and second liquid crystal molecules;
- while no driving voltage being applied between said first electrode and said pixel electrode, the angle between the first and the third liquid crystal molecules and the angle between the third and second liquid crystal molecules both being obtuse angles because (a) said first liquid crystal molecule being perpendicular to the first regulating device for forming a third angle between said first substrate and said first liquid crystal molecule, (b) said second liquid crystal molecule being perpendicular to the second regulating device for forming a fourth angle between said first substrate and said second liquid crystal molecule, and said fourth angle being an obtuse angle, and (c) said third liquid crystal molecule being perpendicular to said first substrate;
- while a driving voltage being applied between said first electrode and said pixel electrode, an oblique electric driving field being formed between said first substrate and said second substrate because of said first regulating device and said second regulating device, said first liquid crystal molecules rotating along a first direction, said second liquid crystal molecule rotating along a second direction different from said first direction, so that all of said first, second, and third liquid crystal molecules being arranged substantially parallel to said first substrate.

14. The liquid crystal display of claim 13, wherein said first regulating device is a first slit of said first electrode, and said second regulating device is a third bump formed on said pixel electrode and made of a low dielectric constant material.

15. The liquid crystal display of claim 13, wherein said first regulating device is a first slit of said first electrode, and said second regulating device is a second slit of said pixel electrode.

* * * * *